United States Patent
Chang et al.

(10) Patent No.: US 8,837,816 B2
(45) Date of Patent: Sep. 16, 2014

(54) METHOD AND APPARATUS FOR GENERATING FINAL DEPTH INFORMATION RELATED MAP THAT IS RECONSTRUCTED FROM COARSE DEPTH INFORMATION RELATED MAP THROUGH GUIDED INTERPOLATION

(75) Inventors: Yu-Lin Chang, Taipei (TW); Yu-Pao Tsai, Kaohsiung (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 247 days.

(21) Appl. No.: 13/527,583

(22) Filed: Jun. 19, 2012

(65) Prior Publication Data

US 2013/0077852 A1   Mar. 28, 2013

Related U.S. Application Data

(60) Provisional application No. 61/539,890, filed on Sep. 27, 2011.

(51) Int. Cl.
*G06K 9/00* (2006.01)
*G06K 9/32* (2006.01)
*G06T 7/00* (2006.01)

(52) U.S. Cl.
CPC ..... *G06T 7/0075* (2013.01); *G06T 2207/10012* (2013.01); *G06T 2207/20016* (2013.01)
USPC .......................................... 382/154; 382/300

(58) Field of Classification Search
None
See application file for complete search history.

(56) References Cited

U.S. PATENT DOCUMENTS

| | | | | |
|---|---|---|---|---|
| 6,856,705 | B2* | 2/2005 | Perez et al. | 382/264 |
| 8,340,422 | B2* | 12/2012 | Boughorbel | 382/173 |
| 8,411,934 | B2* | 4/2013 | Zhang et al. | 382/154 |
| 8,659,592 | B2* | 2/2014 | Wang et al. | 345/419 |
| 2010/0141757 | A1* | 6/2010 | Baik et al. | 348/135 |
| 2010/0239187 | A1* | 9/2010 | Yea et al. | 382/298 |
| 2011/0032341 | A1* | 2/2011 | Ignatov et al. | 348/51 |
| 2011/0188773 | A1* | 8/2011 | Wei et al. | 382/260 |

OTHER PUBLICATIONS

Zhang, et al. (An Edge-Guided Image Interpolation Algorithm via Directional Filtering and Data Fusion), pp. 1-13, Aug. 2006.*
Harman, Rapid 2D to 3D Conversion, Proc. SPIE Stereoscopic Displays and Virtual Reality Systems IX 4660, pp. 78-86, May 2002.
Murata, A Real-Time 2-D to 3-D Image Conversion Technique Using Computed Image Depth, SID SYM, vol. 29, pp. 919-922, 1998.
Cheng, A Novel 2D-to-3D Conversion System Using Edge Information, IEEE Transactions on Consumer Electronics, pp. 1739-1745, vol. 56, No. 3, Aug. 2010.
Chang, Depth Map Generation for 2D-To-3D Conversion by Short-Term Motion Assisted Color Segmentation, pp. 1958-1961, Proceedings of the International Conference on Multimedia and Expo(ICME), 2007.

(Continued)

*Primary Examiner* — Daniel Mariam
(74) *Attorney, Agent, or Firm* — Winston Hsu; Scott Margo

(57) ABSTRACT

A method for generating a final depth information related map includes the following steps: receiving a coarse depth information related map, wherein a resolution of the coarse depth information related map is smaller than a resolution of the final depth information related map; and outputting the final depth information related map reconstructed from the coarse depth information related map by receiving an input data and performing a guided interpolation operation upon the coarse depth information related map according to the input data.

20 Claims, 6 Drawing Sheets

(56) References Cited

OTHER PUBLICATIONS

Ludovic, A 2D to 3D video and image conversion technique based on a bilateral filter, Proc. of SPIE-IS&T Electronic Imaging, vol. 7526, pp. 75260D-1-75260D-10, 2010.

He, Guided Image Filtering, pp. 1-14, 11th European Conference on Computer Vision (ECCV 2010).
Chen, Efficient Depth Image Based Rendering With Edge Dependent Depth Filter and Interpolation, pp. 1314-1317, 2005 IEEE International Conference on Multimedia and Expo (ICME 2005), Amsterdam, Netherland.

* cited by examiner

METHOD AND APPARATUS FOR GENERATING FINAL DEPTH INFORMATION RELATED MAP THAT IS RECONSTRUCTED FROM COARSE DEPTH INFORMATION RELATED MAP THROUGH GUIDED INTERPOLATION

CROSS REFERENCE TO RELATED APPLICATIONS

This application claims the benefit of U.S. provisional application No. 61/539,890, filed on Sep. 27, 2011 and incorporated herein by reference.

BACKGROUND

The disclosed embodiments of the present invention relate to generating a depth information related map, and more particularly, to a method and apparatus for generating a final depth information related map (e.g., a final depth map or a final disparity map) that is reconstructed from a coarse depth information related map (e.g., a coarse depth map or a coarse disparity map) through guided interpolation.

A stereo image pair includes two images with disparity. It stimulates human's vision system to get depth information. The disparity is the displacement between two corresponding points in the stereo image pair. If there is a disparity between two points in the stereo image pair, we can recover the depth information from their disparity. Specifically, in human vision system, images taken from the left eye and the right eye are not the same, and the position of the corresponding points in each image is slightly different. The difference is generally called "disparity". The depth perception is inversely proportional to the disparity. Therefore, when an object has larger disparity in the stereo image pair, the object perceived by the user would have a nearer depth, and when the object has smaller disparity in the stereo image pair, the object perceived by the user would have a furtherer depth.

The generation of a depth information related map, such as a disparity map or a disparity map, is important to a three-dimensional (3D) imaging application. For example, regarding an application of converting a two-dimensional (2D) video into a three-dimensional (3D) video, the depth map may be generated by using one of well-known algorithms, such as computed image depth (CID), bilateral filtering and guided filtering. However, the image details are not kept by the conventional CID approach with block-based operations. As a result, object boundaries are blurred, and the depth perception is reduced. The conventional bilateral filtering approach uses double Gaussian filters to control the blurriness and object boundary. However, it is difficult to adjust the filter parameters to achieve both aggressive smoothing and edge preservation. Besides, it requires large computing power for the double Gaussian filters. Regarding the conventional guided filtering approach, it does not have a linear kernel for controlling the blurriness. As a result, the burden of adjusting the output image characteristic is increased inevitably.

Thus, there is a need for an innovative design which can generate a depth map/disparity map with low computational complexity and enhanced object boundaries.

SUMMARY

In accordance with exemplary embodiments of the present invention, a method and apparatus for generating a final depth information related map (e.g., a final depth map or a final disparity map) that is reconstructed from a coarse depth information related map (e.g., a coarse depth map or a coarse disparity map) through guided interpolation are proposed to solve the above-mentioned problems.

According to a first aspect of the present invention, the exemplary method for generating a final depth information related map is disclosed. The exemplary method includes: receiving a coarse depth information related map, wherein a resolution of the coarse depth information related map is smaller than a resolution of the final depth information related map; and outputting the final depth information related map reconstructed from the coarse depth information related map by receiving an input data and performing a guided interpolation operation upon the coarse depth information related map according to the input data.

An exemplary apparatus for generating a final depth information related map is disclosed. The exemplary apparatus includes a guided interpolation block. The guided interpolation block is arranged for receiving a coarse depth information related map and an input data, wherein a resolution of the coarse depth information related map is smaller than a resolution of the final depth information related map; and arranged for outputting the final depth information related map reconstructed from the coarse depth information related map by performing a guided interpolation operation upon the coarse depth information related map according to the input data.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
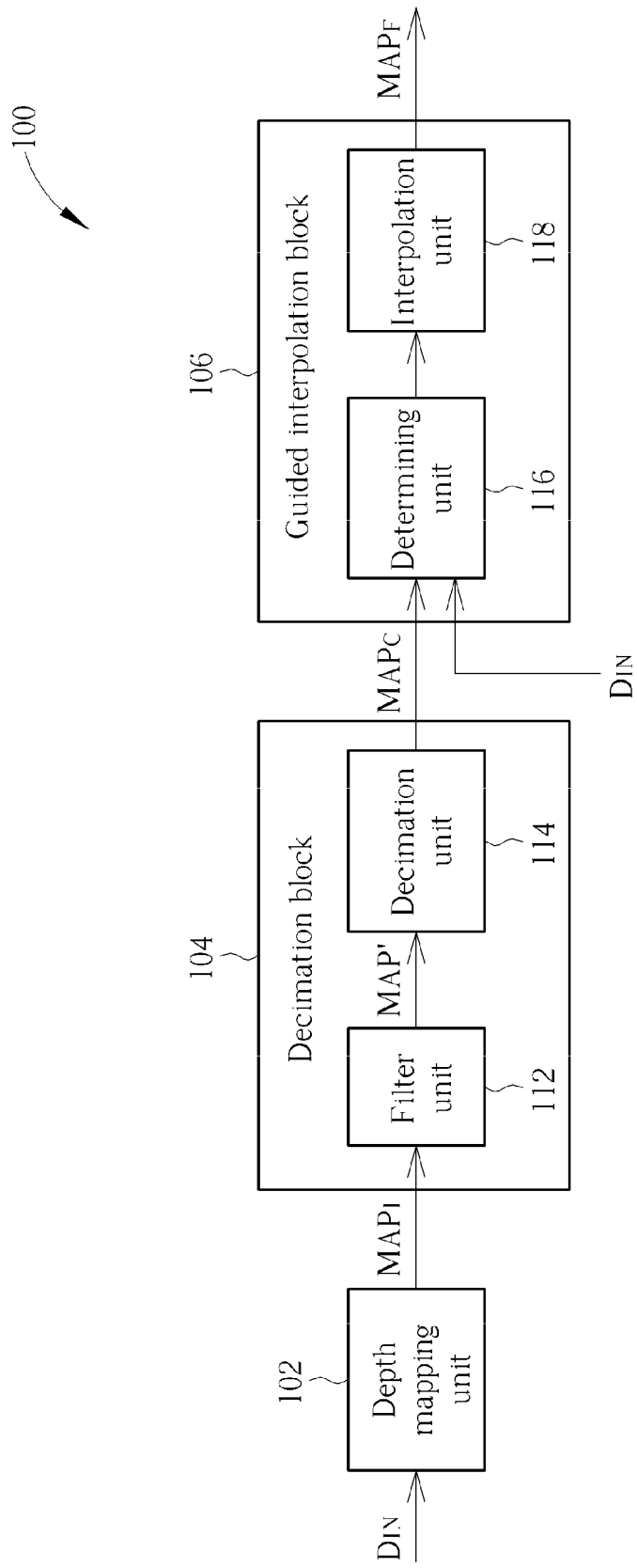
FIG. 1 is a block diagram illustrating an apparatus for generating a final depth information related map according to a first exemplary embodiment of the present invention.

FIG. 1 is a block diagram illustrating an apparatus for generating a final depth information related map according to a first exemplary embodiment of the present invention. The apparatus 100 includes a depth mapping unit 102, a decimation block 104 coupled to the depth mapping unit 102, and a guided interpolation block 106 coupled to the decimation block 104. The depth mapping unit 102 is arranged for employing a predetermined depth mapping method/algorithm to generate an input depth information related map, such as an input depth map $MAP_I$, according to an input data $D_{IN}$. For example, the input data $D_{IN}$ may be an image input composed of pixel values of a frame or a depth input composed of depth values of a frame. In a case where the input data $D_{IN}$ is the image input, the depth mapping unit 102 performs a depth mapping operation (e.g., CID or other approach such as a segmentation based approach or machine learning approach) upon the image input to map original pixel values to new depth values, and accordingly generates the input depth map $MAP_I$ to the following decimation block 104. In another case where the input data $D_{IN}$ is the depth input, the depth mapping unit 102 also performs the depth mapping operation upon the depth input to map original depth values to new depth values, and accordingly generates the input depth map $MAP_I$ to the following decimation block 104.

The decimation block 104 is arranged for receiving an input depth information related map (e.g., the input depth map $MAP_I$ generated from the preceding depth mapping unit 102), and generating a coarse depth information related map (e.g., a coarse depth map $MAP_C$) according to the received input depth information related map. In this embodiment, the decimation block 104 includes a filter unit 112 and a decimation unit 114. By way of example, the filter unit 112 may be implemented by a low-pass filter used for performing a low-pass filtering operation upon the input depth information related map (e.g., the input depth map $MAP_I$) and accordingly generating a filtered depth information related map (e.g., a low-passed filtered depth map MAP'). The low-pass filtering operation would eliminate/reduce undesired texture details and/or noise of the input depth map $MAP_I$. The decimation unit 114 is arranged for performing a decimation operation upon the filtered depth information related map (e.g., the low-passed filtered depth map MAP') to generate the coarse depth information related map (e.g., a coarse depth map $MAP_C$). Specifically, the decimation scale of the decimation operation is greater than one for reducing the map resolution. As a result, the resolution of the coarse depth information related map would be smaller than the resolution of the filtered depth information related map. In this embodiment, the decimation operation may be scalable. For example, the decimation scale is changeable frame by frame. Thus, different decimation scales may be used to achieve the fineness of coarse depth maps of different frames. It should be noted that the present invention has no limitation on the type of the employed decimation algorithm. For example, the decimation may be uniform decimation or non-uniform decimation.

The adaptive low-pass filtering procedure may be combined with down-sampling, as shown in the following equation, to form an adaptive decimation procedure performed by the decimation block 104.

$$D_{deci}(p) = \sum_{q \in W} h(Mp + q) D_{init}(Mp + q) \quad (1)$$

In above equation (1), $D_{deci}(p)$ denotes the values on decimated coarse depth map (e.g., $MAP_C$), M is the decimation scale, W is the footprint of the adaptive low-pass filter, $D_{init}$(p) is the depth values on the original input depth map (e.g., $MAP_I$), and h(p) is the low-pass filter.

Regarding the guided interpolation block 106, it is arranged for receiving the coarse depth information related map (e.g., $MAP_C$) and the input data $D_{IN}$ (e.g., an image input or a depth input), and outputting the final depth information related map (e.g., a final depth map $MAP_F$) that is reconstructed from the coarse depth information related map by performing a guided interpolation operation upon the coarse depth information related map according to the input data $D_{IN}$, wherein the resolution of the coarse depth information related map is smaller than the resolution of the final depth information related map. Specifically, the guided interpolation is performed to reconstruct a depth map that is consistent with object boundaries. The guided interpolation may be expressed by the following equation.

$$D_{final}(p) \approx \sum_{q \in N(p)} g(F(p,q)) l(p,q) D_{deci}(q) \quad (2)$$

Figure 2:
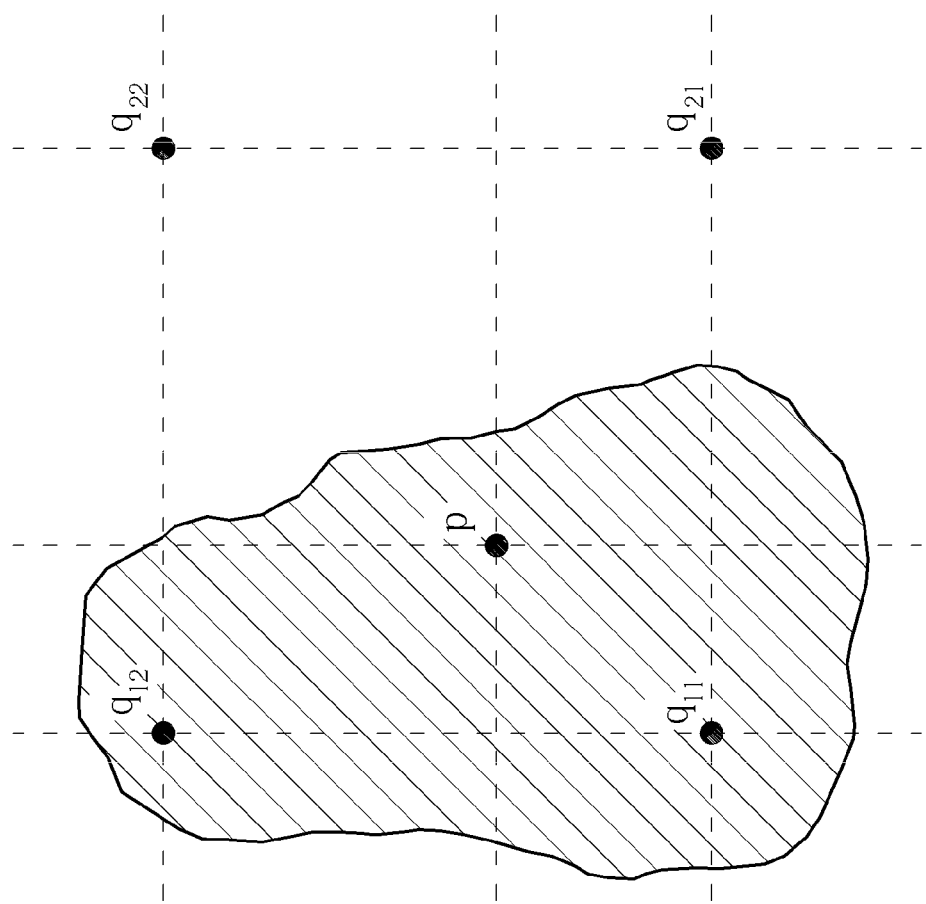
FIG. 2 is a diagram illustrating a location of a depth value to be interpolated and locations of neighboring pixels on the decimated grid.

In above equation (2), $D_{final}(p)$ denotes the interpolated depth value at location p as shown in FIG. 2, N(p) denotes the four p-neighboring pixels $q_{11}, q_{12}, q_{21}, q_{22}$ on the decimated grids as shown in FIG. 2, $D_{deci}(q)$ denotes the depth value at location q on the coarse depth map $MAP_C$, l(p,q) denotes the reconstruction filter coefficient, g(F(p,q)) denotes the guided weighting function, and F(p,q) denotes the image characteristics at locations p and q. Please note that pixels $q_{11}$ and $q_{12}$ are located inside the same object (i.e., an area marked by oblique lines in FIG. 2) and possess similar image characteristic, such as brightness, color, etc, and the pixels $q_{21}$ and $q_{22}$ are located at the other side of the boundary of the object.

In this embodiment, the reconstruction filter coefficient l(p,q) may be expressed as an inverse of the distance to the decimated grid, that is, the phase of the bilinear interpolation employed by the guided interpolation block 106. Besides, the guided weighting function g(F(p,q)) may be a Gaussian function derived from part of a bilateral filter. For example, $$g(F(p,q)) = \frac{1}{W} e^{-a|I(p)-I(q)|},$$

where I(p) denotes the image characteristic at location p, and I(q) denotes the image characteristic at location q. The adaptation of the guided weighting function can be determined by referring to image characteristics (e.g., luma characteristics, chroma characteristics, and/or object segmentation masks) or user inputs. For example, when the difference between the image characteristics at locations p and q is smaller, there is higher possibility that the locations p and q are within the same object. Hence, the output of the guided weighting function would be larger to make the depth value at location q be with larger weighting while setting the reconstructed/interpolated depth value at location p. When the difference between the image characteristics at locations p and q is larger, there is higher possibility that the locations p and q are at different sides of an object. Hence, the output of the guided weighting function would be smaller to make the depth value at location q with smaller weighting involved in setting the reconstructed/interpolated depth value at location p. As the reconstruction is adjusted by the guided weighting function for object boundary enhancement, the reconstructed final depth map $MAP_F$ would have depth values aligned with object boundaries such that depth values within one object are similar and smooth. To put it simply, the low-pass filter for decimation is designed to reduce the noise and/or texture details, and the guided weighting function for interpolation is designed to enhance the object boundaries on the depth map.

As shown in FIG. 1, the guided interpolation block 106 includes a determining unit 116 and an interpolation unit 118. The determining unit 116 is arranged to determine image characteristics (e.g., I(p) and I(q)) according to values located at a plurality of first locations (e.g., $q_{11}$, $q_{12}$, $q_{21}$ and $q_{22}$) and a second location (e.g., p) in the input data $D_{IN}$; and determining a guided weighting function (e.g., g(F(p,q))) according to the image characteristics. Regarding the interpolation unit 118, it is arranged for generating an interpolated value (e.g., $D_{final}(p)$) in the final depth information related map (e.g., $MAP_F$) that corresponds to the second location by performing the guided interpolation operation according to the guided weighting function and values (e.g. $D_{deci}(q)$ in the coarse depth information related map that correspond to the first locations respectively.

Figure 3:
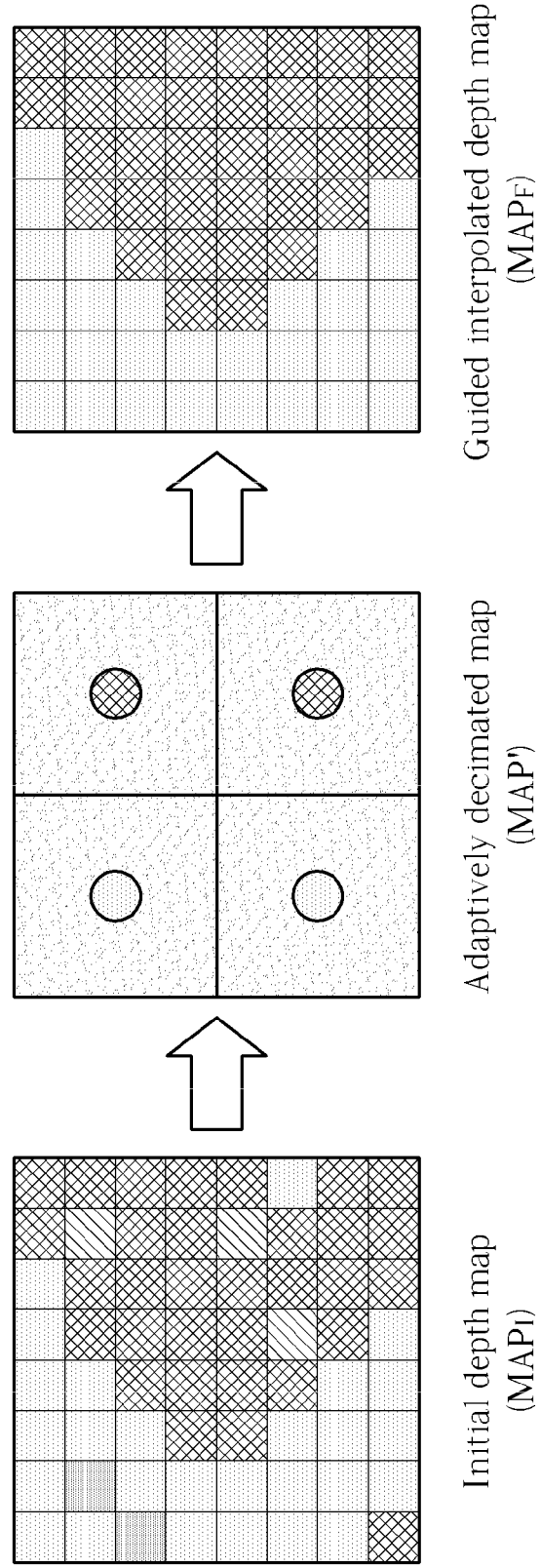
FIG. 3 is a diagram illustrating an example of the proposed depth map generation approach.

An example of the proposed depth map generation approach is illustrated in FIG. 3 for better understanding of the technical features of the present invention. As can be seen from the example shown in FIG. 3, the undesired texture detail and/or noise present in an initial depth map generated by CID are removed by adaptive low-pass filtering and decimation, thus creating a coarse depth map. Next, the guided interpolation reconstructs the decimated depth map with consideration of the object boundaries, thus creating a fine depth map.

As mentioned above, the input data $D_{IN}$ may be an image input composed of pixel values of a frame or a depth input composed of depth values of a frame. In a case where the input data $D_{IN}$ is an image input such as a 2D image, the proposed apparatus 100 may be employed in a depth map refinement application for 2D-to-3D conversion. In another case where the input data $D_{IN}$ is a depth input such as a depth sensor output, the proposed apparatus 100 may be employed in an application for refining the depth map generated from a depth sensor. The depth sensor can be used to generate a depth map. However, the depth map captured by the depth sensor may be noisy. After receiving the noisy depth map generated from the depth sensor, the proposed apparatus 100 helps to reduce the noise in the depth map and align the depth values with the object boundaries to sharpen the depth map.

Figure 4:
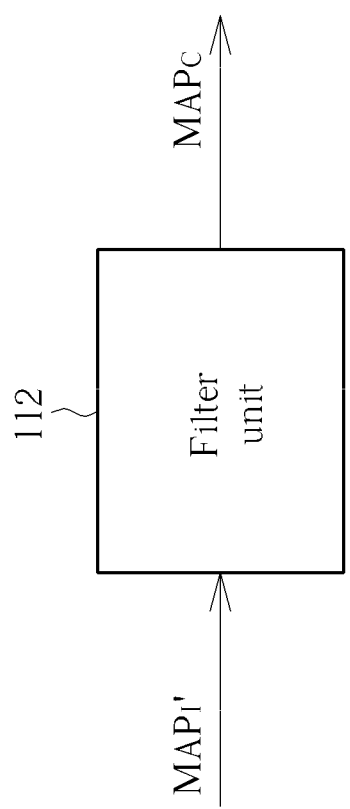
FIG. 4 is a diagram illustrating a first alternative design for generating a coarse depth information related map.

In above example shown in FIG. 1, the decimation block 104 is configured to support a filter function as well as a decimation function. However, this is for illustrative purposes only, and is not meant to be a limitation of the present invention. For example, the decimation block 104 may be replaced with a single filter unit or a single decimation unit, depending upon actual design consideration. FIG. 4 is a diagram illustrating a first alternative design for generating a coarse depth information related map. If the input depth information related map (e.g., an input depth map $MAP_I'$ shown in FIG. 4) generated from a preceding stage (e.g., the depth mapping unit 102) or other depth map source has a resolution smaller than that of the final depth information related map (e.g., the final depth map $MAP_F$), the aforementioned decimation may be omitted. Hence, the filter unit 112 performs a filtering operation (e.g., a low-pass filtering operation) upon the input depth information related map (e.g., the input depth map $MAP_I'$) to thereby generate a coarse depth information related map (e.g., the coarse depth map $MAP_C$) to the next stage (e.g., the guided interpolation block 106). The same objective of eliminating/reducing undesired texture details and/or noise of the depth map is achieved.

Figure 5:
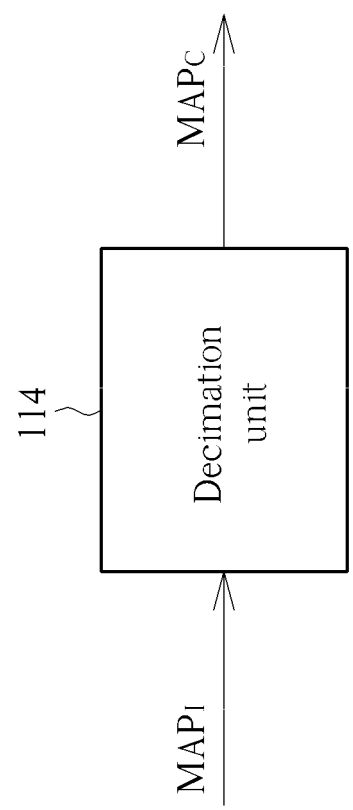
FIG. 5 is a diagram illustrating a second alternative design for generating a coarse depth information related map.

FIG. 5 is a diagram illustrating a second alternative design for generating a coarse depth information related map. As mentioned above, a low-pass filtering operation may be employed for eliminating/reducing undesired texture details and/or noise of the depth map. However, with a proper decimation filter design, the decimation operation may also have the effect of eliminating/reducing undesired texture details and/or noise of the depth map. In this alternative design, the decimation unit 114 is configured to perform a decimation operation upon the input depth information related map (e.g., the input depth map $MAP_I$) generated from the preceding stage (e.g., the depth mapping unit 102) to thereby generate the coarse depth information related map (e.g., the coarse depth map $MAP_C$) to the next stage (e.g., the guided interpolation block 106).

In above embodiment, the coarse depth information related map is generated through the depth mapping unit 102 and the decimation block 104. However, the coarse depth information related map is allowed to be generated by other means. In other words, any application using the proposed guided interpolation block 106 to generate a final depth information related map by performing guided interpolation upon a coarse depth information related map would fall within the scope of the present invention.

Figure 6:
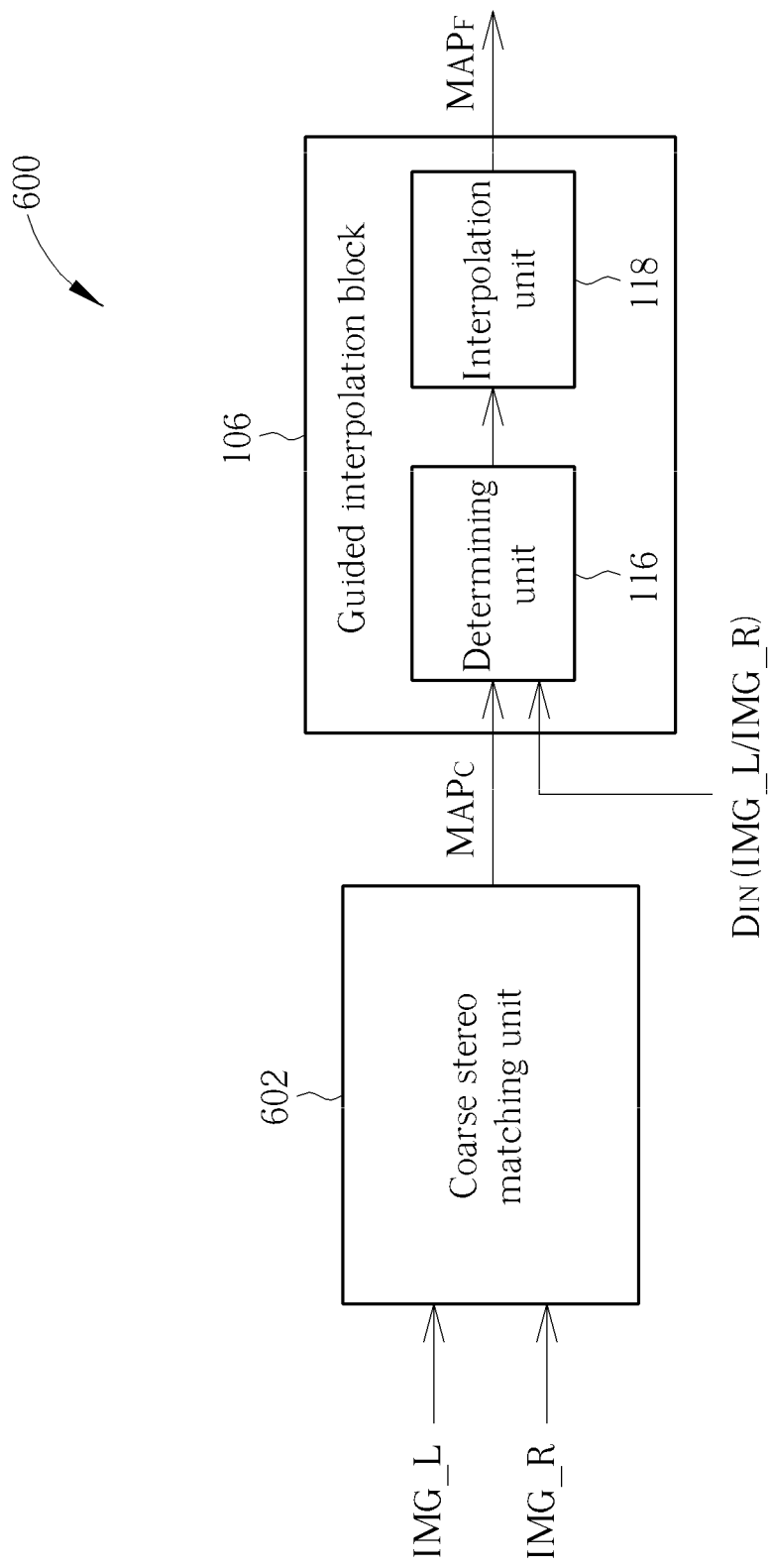
FIG. 6 is a block diagram illustrating an apparatus for generating a final depth information related map according to a second exemplary embodiment of the present invention.

In above embodiment, the coarse depth information related map to be processed by the guided interpolation block 106 is a coarse depth map $MAP_C$. In an alternative design, the coarse depth information related map to be processed by the guided interpolation block 106 may be a coarse disparity map. Hence, the guided interpolation block 106 may be employed for reconstructing a final disparity map through performing guided interpolation upon a coarse disparity map. Please refer to FIG. 6, which is a block diagram illustrating an apparatus for generating a final depth information related map according to a second exemplary embodiment of the present invention. The apparatus 600 may be employed to help the stereo matching to generate an object-fitting disparity map. As shown in FIG. 6, a coarse stereo matching unit 602 is arranged for receiving a left-eye image IMG_L and a right-eye image IMG_R, and generating the coarse depth information related map (e.g., a coarse disparity map $MAP_C'$) by performing a coarse stereo matching operation upon the left-eye image IMG_L and the right-eye image IMG_R. In general, the resolution of the disparity map generated by stereo matching is coarse. Thus, the coarse stereo matching operation may be regarded as a procedure composed of "depth mapping" and "adaptive decimation". In this embodiment, the guided interpolation block 106 receives the coarse depth information related map (e.g., the coarse disparity map $MAP_C'$), and applies the aforementioned guided interpolation to the coarse depth information related map to generate the final depth information related map (e.g., a final disparity map $MAP_F'$), where the input data $D_{IN}$ referred to by the determining unit 116 for setting the guided weighting function may be one of the left-eye image IMG_L and the right-eye image IMG_R. Similarly, the proposed guided interpolation block 106 helps to align disparity values with object boundaries for sharpening the disparity map.

Briefly summarized, texture details and/or noise of the depth map/disparity map can be filtered out by the low-pass filter and decimation, and the guided interpolation reconstructs the depth map/disparity map with the consideration of object boundaries. Compared to the conventional approaches, the proposed approach has lower computational complexity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for generating a final depth information related map, comprising:
   receiving a coarse depth information related map, wherein a resolution of the coarse depth information related map is smaller than a resolution of the final depth information related map; and
   outputting the final depth information related map reconstructed from the coarse depth information related map by receiving an input data and performing a guided interpolation operation upon the coarse depth information related map according to the input data;
   wherein the step of performing the guided interpolation operation upon the coarse depth information related map according to the input data comprises:
   determining a plurality of image characteristics according to values located at a plurality of first locations and a second location in the input data;
   determining parameters of a guided weighting function according to the image characteristics; and
   generating an interpolated value in the final depth information related map that corresponds to the second location by utilizing an interpolation unit to perform the guided interpolation operation according to the guided weighting function and values in the coarse depth information related map that correspond to the first locations respectively.

2. The method of claim 1, wherein the final depth information related map and the coarse depth information related map are depth maps or disparity maps.

3. The method of claim 1, further comprising:
   receiving an input depth information related map; and
   generating the coarse depth information related map by performing at least a decimation operation according to the input depth information related map, wherein a decimation scale of the decimation operation is greater than one.

4. The method of claim 3, wherein the decimation operation is a scalable.

5. The method of claim 4, wherein the decimation scale is changeable frame by frame.

6. The method of claim 3, wherein the step of generating the coarse depth information related map further comprises:
   performing a filtering operation upon the input depth information related map, and accordingly generating a filtered depth information related map;
   wherein the decimation operation is performed upon the filtered depth information related map to generate the coarse depth information related map.

7. The method of claim 3, wherein the input depth information related map is a depth sensor output.

8. The method of claim 3, further comprising:
   generating the input depth information related map by performing a depth mapping operation upon an image input to map original pixel values to new depth values, or by performing the depth mapping operation upon a depth input to map original depth values to new depth values.

9. The method of claim 1, further comprising:
   receiving an input depth information related map; and
   generating the coarse depth information related map by performing a filtering operation according to the input depth information related map.

10. The method of claim 1, further comprising:
    generating the coarse depth information related map by performing a coarse stereo matching operation upon a left-eye image and a right-eye image.

11. An apparatus for generating a final depth information related map, comprising:
    a guided interpolation block, arranged for receiving a coarse depth information related map and an input data, wherein a resolution of the coarse depth information related map is smaller than a resolution of the final depth information related map; and outputting the final depth information related map reconstructed from the coarse depth information related map by performing a guided interpolation operation upon the coarse depth information related map according to the input data;
    wherein the guided interpolation block comprises:
    a determining unit, arranged for determining a plurality of image characteristics according to values located at a plurality of first locations and a second location in the input data, and determining parameters of a guided weighting function according to the image characteristics; and
    an interpolation unit, arranged for generating an interpolated value in the final depth information related map that corresponds to the second location by performing the guided interpolation operation according to the guided weighting function and values in the coarse depth information related map that correspond to the first locations respectively.

12. The apparatus of claim 11, wherein the final depth information related map and the coarse depth information related map are depth maps or disparity maps.

13. The apparatus of claim 11, further comprising:
    a decimation block, arranged for receiving an input depth information related map; and generating the coarse depth information related map by performing at least a decimation operation according to the input depth information related map, wherein a decimation scale of the decimation operation is greater than one.

14. The apparatus of claim 13, wherein the decimation operation is a scalable.

15. The apparatus of claim 14, wherein the decimation scale is changeable frame by frame.

16. The apparatus of claim 13, wherein the decimation block comprises:
    a filter unit, arranged for performing a filtering operation upon the input depth information related map, and accordingly generating a filtered depth information related map; and
    a decimation unit, arranged for performing the decimation operation upon the filtered depth information related map to generate the coarse depth information related map.

17. The apparatus of claim 13, wherein the input depth information related map is a depth sensor output.

18. The apparatus of claim 13, further comprising:
    a depth mapping unit, arranged for generating the input depth information related map by performing a depth mapping operation upon an image input to map original pixel values to new depth values, or by performing the depth mapping operation upon a depth input to map original depth values to new depth values.

19. The apparatus of claim 11, further comprising:
    a filter unit, arranged for receiving an input depth information related map, and generating the coarse depth information related map by performing a filtering operation upon the input depth information related map.

20. The apparatus of claim 11, further comprising:
a coarse stereo matching unit, arranged for receiving a left-eye image and a right-eye image, and generating the coarse depth information related map by performing a coarse stereo matching operation upon the left-eye image and the right-eye image.

* * * * *